(12) United States Patent
Bajpai et al.

(10) Patent No.: US 9,804,858 B2
(45) Date of Patent: Oct. 31, 2017

(54) SYSTEM FOR RE-ENUMERATION OF USB 3.0 COMPATIBLE PERIPHERAL DEVICES

(71) Applicant: Cypress Semiconductor Corporation, San Jose, CA (US)

(72) Inventors: Pradeep Kumar Bajpai, Sunnyvale, CA (US); Robert G. Rundell, Bellevue, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/277,529

(22) Filed: Sep. 27, 2016

(65) Prior Publication Data

US 2017/0017496 A1    Jan. 19, 2017

Related U.S. Application Data

(63) Continuation of application No. 14/675,128, filed on Mar. 31, 2015, which is a continuation of application
(Continued)

(51) Int. Cl.
*G06F 13/42* (2006.01)
*G06F 9/44* (2006.01)
(Continued)

(52) U.S. Cl.
CPC .......... *G06F 9/4413* (2013.01); *G06F 9/4411* (2013.01); *G06F 11/3041* (2013.01);
(Continued)

(58) Field of Classification Search
CPC .. G06F 9/4411; G06F 9/4413; G06F 11/3065; G06F 13/426; G06F 2213/0042; G06F 11/3041
See application file for complete search history.

(56) References Cited

U.S. PATENT DOCUMENTS 6,647,452 B1    11/2003 Sonoda
6,738,834 B1    5/2004 Williams et al.
(Continued)

FOREIGN PATENT DOCUMENTS

CN    101246428 A    8/2008
CN    102272723 A    12/2011
(Continued)

OTHER PUBLICATIONS

Hewlett-Packard et al. Universal Serial Bus 3.0 Specification, Jun. 6, 2011 Revision 1.0, pp. 1-3, 3-6, 6-34, and 7-13. The full document is available at http://www.usb.org/developers/docs/.*
(Continued)

*Primary Examiner* — Henry Tsai
*Assistant Examiner* — John Roche

(57) ABSTRACT

Described herein is a system comprising a peripheral device that is connected to a host device over a bus compatible with USB 3.0. The host device comprises a reduced functionality USB host controller configured to perform a set of one or more preprogrammed functions from the USB 3.0 specification, and a universal asynchronous receiver and transmitter (UART) configured to sample USB response data received from the peripheral device over the bus.

5 Claims, 2 Drawing Sheets

Related U.S. Application Data

No. 13/248,326, filed on Sep. 29, 2011, now Pat. No. 8,996,747.

(51) Int. Cl.
  *G06F 11/30* (2006.01)
  *G06F 13/38* (2006.01)

(52) U.S. Cl.
  CPC ........ *G06F 11/3055* (2013.01); *G06F 13/385* (2013.01); *G06F 13/426* (2013.01); *G06F 13/4295* (2013.01); *G06F 2213/0042* (2013.01)

(56) References Cited

U.S. PATENT DOCUMENTS

| | | | |
|---|---|---|---|
| 6,839,778 | B1 | 1/2005 | Sartore et al. |
| 7,500,027 | B2 | 3/2009 | Wu |
| 7,694,032 | B2 | 4/2010 | Lim et al. |
| 7,707,323 | B2 | 4/2010 | Matton et al. |
| 7,711,863 | B2 | 5/2010 | Matton et al. |
| 7,752,029 | B2 | 7/2010 | Tamayo et al. |
| 7,908,335 | B1 | 3/2011 | Citterelle et al. |
| 8,028,040 | B1* | 9/2011 | Hobbs ................. G06F 9/45558 370/389 |
| 8,041,866 | B2 | 10/2011 | Barake et al. |
| 8,171,502 | B2 | 5/2012 | Mullis, II et al. |
| 8,176,227 | B2 | 5/2012 | Devam et al. |
| 8,219,729 | B1 | 7/2012 | Wright |
| 8,843,664 | B2 | 9/2014 | Bajpai et al. |
| 8,996,747 | B2 | 3/2015 | Bajpai et al. |
| 9,122,288 | B1* | 9/2015 | Nayak ........................ G05F 1/10 |
| 2004/0083302 | A1* | 4/2004 | Thornton ................. G06F 3/023 709/231 |
| 2006/0064513 | A1 | 3/2006 | Creigh |
| 2007/0115831 | A1 | 5/2007 | Sharma et al. |
| 2008/0054855 | A1 | 3/2008 | Hussain et al. |
| 2008/0126573 | A1 | 5/2008 | Matton et al. |
| 2008/0195765 | A1 | 8/2008 | Xie et al. |
| 2008/0263243 | A1* | 10/2008 | Wright ............. H03K 19/00369 710/63 |
| 2009/0222685 | A1 | 9/2009 | Foster et al. |
| 2009/0271533 | A1 | 10/2009 | Asnaashari |
| 2010/0093401 | A1 | 4/2010 | Moran et al. |
| 2010/0122021 | A1 | 5/2010 | Lee et al. |
| 2010/0180051 | A1 | 7/2010 | Harris |
| 2010/0180138 | A1 | 7/2010 | Yen et al. |
| 2010/0185808 | A1 | 7/2010 | Yu et al. |
| 2010/0223402 | A1 | 9/2010 | Chen |
| 2010/0275037 | A1 | 10/2010 | Lee et al. |
| 2010/0312929 | A1* | 12/2010 | Liu ....................... G06F 13/385 710/63 |
| 2010/0328493 | A1 | 12/2010 | Hanlon et al. |
| 2011/0066266 | A1 | 3/2011 | Nakano |
| 2011/0093633 | A1 | 4/2011 | Solomon et al. |
| 2011/0106989 | A1 | 5/2011 | Solomon et al. |
| 2011/0113079 | A1 | 5/2011 | Jou et al. |
| 2011/0126005 | A1 | 5/2011 | Carpenter et al. |
| 2011/0161530 | A1 | 6/2011 | Pietri et al. |
| 2011/0179201 | A1 | 7/2011 | Monks et al. |
| 2012/0008938 | A1 | 1/2012 | Tang et al. |
| 2012/0020404 | A1 | 1/2012 | Hsieh et al. |
| 2012/0023318 | A1 | 1/2012 | Xing et al. |
| 2012/0102244 | A1 | 4/2012 | Shiraishi |
| 2012/0311122 | A1 | 12/2012 | Johnsen et al. |
| 2013/0086282 | A1 | 4/2013 | Bajpai et al. |
| 2013/0132614 | A1 | 5/2013 | Bajpai et al. |
| 2015/0100707 | A1 | 4/2015 | Bajpai et al. |

FOREIGN PATENT DOCUMENTS

| | | |
|---|---|---|
| CN | 103314365 A | 9/2013 |
| EP | 2372565 A1 | 10/2011 |
| WO | 9901820 A | 1/1999 |
| WO | 2010088567 A1 | 8/2010 |
| WO | 2010132944 A1 | 11/2010 |

OTHER PUBLICATIONS

U.S. Appl. No. 13/248,326: "Methods and Physical Computer-Readable Storage Media for Initiating Re-Enumeration of USB 3.0 Compatible Devices," Pradeep Bajpai, filed Sep. 29, 2011; 20 pages.
U.S. Appl. No. 13/632,084: "Re-Enumeration of USB 3.0 Compatible Devices" Pradeep Kumar Bajpai et al., filed Sep. 30, 2012; 49 pages.
U.S. Appl. No. 14/491,809: "Re-Enumeration of USB 3.0 Compatible Devices" Pradeep Bajpai et al., filed Sep. 19, 2014; 50 pages.
U.S. Appl. No. 14/675,128: "Methods and Physical Computer-Readable Storage Media for Initiating Re-Enumeration of USB 3.0 Compatible Devices," Pradeep Bajpai et al., filed Mar. 31, 2014; 19 pages.
EPO Supplementary European Search Report for International Application EP12885458 dated Mar. 21, 2016; 6 pages.
European Patent Office communication for International Application EP12885458 dated Oct. 15, 2016; 1 page, Apr. 15, 2016.
Hewlett-Packard et al. Universal Serial Bus 3.0 Specification. Jun. 6, 2011 Revision 1.0. pp. 3-6, 6-34, and 7-13. The full document is available on http://www.usb.org/developers/docs/.
International Search Report for International Application No. PCT/US11/54241 dated Oct. 18, 2012; 3 pages.
International Search Report for International Application No. PCT/U52012/072204 mailed Mar. 8, 2013; 2 pages.
SIPO Office Action for Application No. 201180002764.9 dated Jul. 18, 2016; 6 pages.
Universal Serial Bus 3.0 Specification, Nov. 12, 2008 (Nov. 12, 2008): URL:http//www.usb.org/developers/docs/, retrieved on [Jan. 20, 2009].
USB 3.0 Connection Exerciser; online Sep. 2012; http://www.mcci-jp.com/devtools/exerciser.html; MCCI product page; 3 pages.
USB Background—Knowledge Base—Article 10047—Total Phase, Inc., Jun. 17, 2012, pp. 1-16. Retrieved from the internet <URL:http://web.archive.org/web/20120617132016/http://www.totalphase.com/suppor/kb/10047/>.
USB Device Disconnect-On-Demand with uPSD32xx; online http://www.icbase.com/pdf/STM/STM30020501.pdf; STMicroelectronics; copyright 2004; 11 Pages.
USPTO Advisory Action for U.S. Appl. No. 13/248,326 dated Oct. 1, 2013; 3 pages.
USPTO Advisory Action for U.S. Appl. No. 13/632,084 dated Sep. 8, 2014; 3 pages.
USPTO Advisory Action for U.S. Appl. No. 13/632,084 dated Aug. 2, 2013; 3 pages.
USPTO Advisory Action for U.S. Appl. No. 14/491,809 dated Oct. 29, 2015; 3 pages.
USPTO Final Rejection for U.S. Appl. No. 13/248,326 dated Jun. 10, 2014; 19 pages.
USPTO Final Rejection for U.S. Appl. No. 13/248,326 dated Jul. 18, 2013; 17 pages.
USPTO Final Rejection for U.S. Appl. No. 13/632,084 dated Mar. 24, 2014; 11 pages.
USPTO Final Rejection for U.S. Appl. No. 13/632,084 dated Jun. 24, 2013; 18 pages.
USPTO Final Rejection for U.S. Appl. No. 14/491,809 Aug. 7, 2015; 17 pages.
USPTO Final Rejection for U.S. Appl. No. 14/675,128 dated Dec. 18, 2015; 8 pages.
USPTO Final Rejection for U.S. Appl. No. 14/491,809 dated May 5, 2016; 16 pages.
USPTO Non Final Rejection for U.S. Appl. No. 14/491,809 dated Feb. 2, 2015; 26 pages.
USPTO Non-Final Rejection for U.S. Appl. No. 13/248,326 dated Jan. 31, 2013; 17 pages.
USPTO Non-Final Rejection for U.S. Appl. No. 13/248,326 dated Oct. 3, 2014; 23 pages.
USPTO Non-Final Rejection for U.S. Appl. No. 13/248,326 dated Nov. 7, 2013; 17 pages.
USPTO Non-Final Rejection for U.S. Appl. No. 13/632,084 dated Jan. 29, 2013; 16 pages.

(56) References Cited

OTHER PUBLICATIONS

USPTO Non-Final Rejection for U.S. Appl. No. 13/632,084 dated Oct. 24, 2013; 20 pages.
USPTO Non-Final Rejection for U.S. Appl. No. 14/491,809 dated Nov. 23, 2015; 17 pages.
USPTO Non-Final Rejection for U.S. Appl. No. 141675,128 dated Jul. 16, 2015, 39 pages.
USPTO Notice of Allowance for U.S. Appl. No. 13/248,326 dated Jan. 14, 2015; 8 pages.
USPTO Notice of Allowance for U.S. Appl. No. 13/248,326 dated Feb. 20, 2015; 2 pages.
USPTO Notice of Allowance for U.S. Appl. No. 13/632,084 dated May 15, 2014; 10 pages.
USPTO Notice of Allowance for U.S. Appl. No. 13/632,084 dated Jun. 24, 2014; 8 pages.
USPTO Notice of Allowance for U.S. Appl. No. 14/491,809 dated Sep. 12, 2016; 12 pages.
USPTO Notice of Allowance for U.S. Appl. No. 14/675,128 dated Mar. 17, 2016; 13 pages.
USPTO Notice of Allowance for U.S. Appl. No. 14/675,128 dated Sept. 26, 2016; 9 pages.
USPTO Notice of Allowance for U.S. Appl. No. 14/675,128 dated Jun. 6, 2016; 9 pages.
Written Opinion of the International Searching Aurhority for International Application No. PCT/US2012/072204 mailed Mar. 8, 2013; 3 pages.
Written Opinion of the International Searching Authority for International Application No. PCT/US11/54241 dated Oct. 18, 2012; 5 pages.
EPO Search Report for European Application No. 11873082 dated Sep. 24, 2015: 6 pages.
EPO Search Report for European Application No. 12885458.5 dated Dec. 8, 2016; 3 pages.
SIPO Office Action for Application No. 201180002764.9 dated Dec. 30, 2016; 5 pages.
SIPO Office Action for Chinese Application No. 2012800740151 dated Dec. 23, 2016; 9 pages.
USPTO Notice of Allowance for U.S. Appl. No. 14/491,809 dated Jan. 20, 2017; 9 pages.
USPTO Notice of Allowance for U.S. Appl. No. 14/675,128 dated Jan. 19, 2017; 8 pages.
SIPO Office Action for Application No. 201180002764.9 dated May 9, 2017.
EPO Office Action for European Application No. 12885458.5 dated Jul. 21, 2017; 3 pages.
SIPO Office Action for Chinese Application No. 2012800740151 dated Aug. 25, 2017; 8 pages.

\* cited by examiner

SYSTEM FOR RE-ENUMERATION OF USB 3.0 COMPATIBLE PERIPHERAL DEVICES

CROSS-REFERENCE TO RELATED APPLICATIONS

This application is a continuation of U.S. patent application Ser. No. 14/675,128, filed Mar. 31, 2015, which is a continuation of U.S. patent application Ser. No. 13/248,326, filed Sep. 29, 2011, now U.S. Pat. No. 8,996,747, issued Mar. 31, 2015, all of which are incorporated by reference herein in their entirety.

TECHNICAL FIELD

This disclosure relates to the field of universal serial buses (USBs) and, in particular, to re-enumeration of a device compatible with USB 3.0.

BACKGROUND

The Universal Serial Bus (USB) standard provides a universal interface for a Personal Computer (PC) that includes universal plug-and-play and relative ease-of-use. Specifically, when a USB peripheral device is plugged-in to a USB port on a PC, the system will auto-detect and auto-configure the peripheral device. The USB peripheral devices may include devices such as printers, scanners, keyboards, a mouse, joysticks, digital cameras, digital video cameras, data acquisition devices, modems, speakers, telephones or video phones, storage devices such as ZIP drives, or any other peripheral or computing device. In most cases, there is zero user intervention. The USB interface also eliminates the need for multiple input/output (I/O) standards to peripheral devices, thereby simplifying PC connectivity for the consumer as well as simplifying manufacturing for the PC Original Equipment Manufacturers (OEMs).

The original USB specification has evolved over time to meet the needs of industry, resulting in three versions available today. The first two versions, USB 1.0 (later revised to USB 1.1) and USB 2.0, respectively, are wired interfaces, as they use a cable between a host (for example a personal computer or PC) and the USB peripheral device. Although the USB 1.1 has a top transmission speed of 12 million bits/second (Mb/s), system performance may become sluggish if multiple multimedia devices are attached to one USB 1.1 port. USB 2.0 transmission speed is increased to 480 mega bits/second but maintains backwards compatibility to the full speed (12 Mb/s) and low speed (1.5 Mb/s) devices defined in the USB 1.1 specification. USB 3.0 has transmission speeds of up to 5 gigabits/second and has downward compatibility to USB 2.0 devices.

Although USB 3.0 provides many improvements over previous USB versions, facets of its implementation may not be explicitly defined and may be improved and/or extended. For example, at present, there is no specification-compliant method in existence to perform re-enumeration.

BRIEF DESCRIPTION OF THE DRAWINGS

The present disclosure is illustrated by way of example, and not by way of limitation, in the figures of the accompanying drawings.

DETAILED DESCRIPTION

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter and their equivalents may be practiced without these specific details.

The detailed description includes references to the accompanying drawings, which form a part of the detailed description. The drawings show illustrations in accordance with example embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. The following detailed description is not to be taken in a limiting sense as the scope of the subject matter to be patented is defined by the appended claims and their equivalents.

A method is provided that allows re-enumeration to be initiated on a USB 3.0 compatible device. The method includes establishing a connection with a host, transmitting an indicator from the device to the host to cause a Link Training and Status State Machine (LTSSM) of the host to move from active state (U0) to one of SS.Inactive and RX.Detect, synchronizing the device with the host, and presenting a new configuration of the device to the host. By transmitting the indicator from the device to the host, a disconnection between the device and host is emulated. As a result, the host responds by reconnecting to the device and performing re-enumeration on the device. The method may be implemented into a system including at least one host and device.

Figure 1:
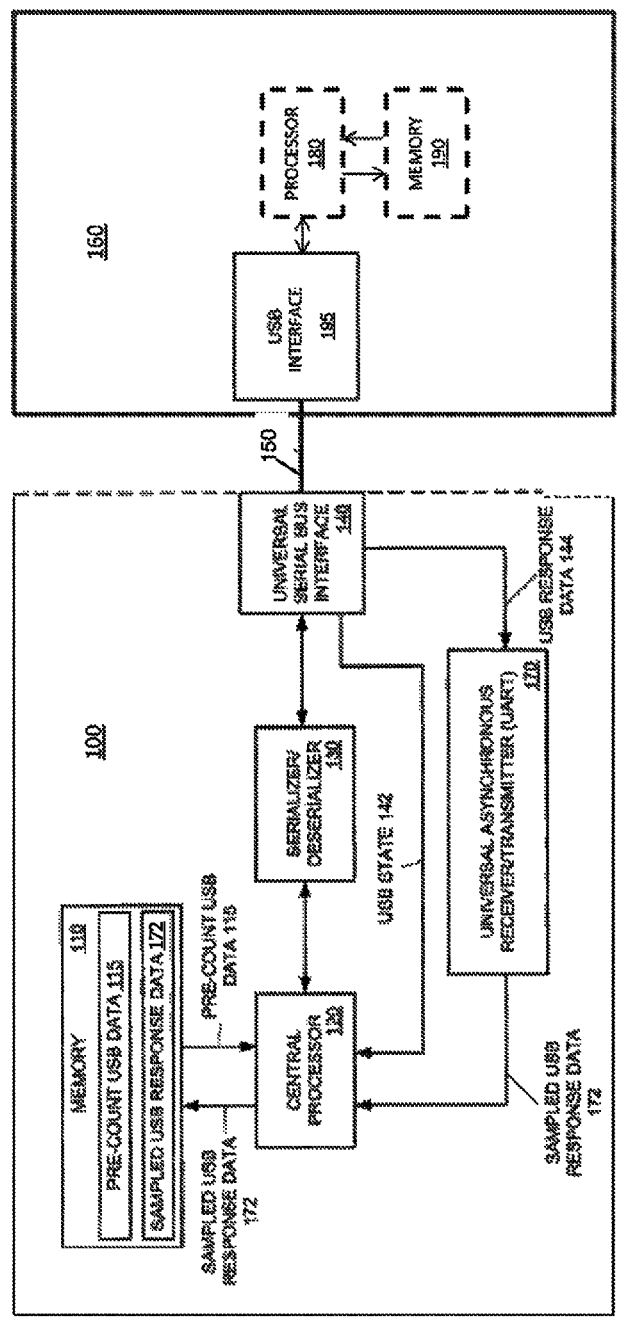
FIG. 1 is a block diagram of a universal serial bus (USB) host system connected to a device, according to an embodiment.

FIG. 1 is a block diagram of a universal serial bus (USB) host system 100 connected to a device 160, according to an embodiment. The USB host system 100 is coupled to the device 160 via a bus 150. The bus 150 may include a USB cable, PCB traces, or other electrical physical connections. In other embodiments, the bus 150 and device 160 are configured to comply with USB 3.0 standards delineated in Universal Serial Bus 3.0 Specification, revision 1.0, Nov. 12, 2008, which may also be found at http://www.usb.org/developers/docs.

The USB host system 100 includes a central processor 120 to control the communication with the device 160 for the USB host system 100. For instance, the central processor 120 may direct the USB host system 100 to issue requests over the bus 150, synchronize with incoming data from the bus 150 by tracking synchronization bits in the incoming data, decode the incoming data, determine whether the incoming data was received correctly, and respond to the incoming data when necessary. In an embodiment, the central processor 120 is a programmed processor (e.g., a central processing unit), hard-wired, or fixed-function logic. In other embodiments, the central processor 120 has a different configuration.

The USB host system 100 may be a reduced functionality USB host controller, capable of performing a set of one or more preprogrammed functions from the USB specification. For instance, when the USB host system 100 is incorporated into a host device, such as a battery charger, the USB host system 100 may include functionality that allows the host device to charge the battery of a device 160 (such as a cellphone, personal digital assistant, digital cameras, digital video cameras, and the like) via the bus 150. In another example, the USB host system 100 may include functionality that allows the host device to communicate commands to begin operation of a device 160 (such as a printer, a camera, a mouse, printers, scanners, keyboards, joysticks, data acquisition devices, modems, speakers, telephones or video phones, storage devices such as ZIP drives or another peripheral device).

The USB host system 100 includes a memory 110 to store USB data 115 for use in transmissions over the bus 150 to the device 160. This USB data 115 may be generated and stored in memory 110 by the central processor 120 or by another device internal to or external from the USB host system 100. The USB data 115 may have a format that allows the USB host system 100 to transfer the USB data 115 from the memory 110 to the bus 150 without having to perform alterations on the USB data 115.

The USB host system 100 includes a USB physical interface 140 to couple to the bus 150. The USB interface 140 may identify when a device (e.g., device 160) is coupled to the USB host system 100 via the bus 150 and provide a USB state 142 to the central processor 120 that indicates the device 160 is coupled to the USB host system 100 via the bus 150. The bus 150 may have 2 states: a J state and a K state. The USB interface 140 may identify when a device 160 is coupled to the USB host system 100 according to the presence of one of these USB states, or from transitions in the USB states.

The central processor 120 may receive USB data 115 from the memory 110, e.g., responsive to the USB state 142, and direct the USB host system 100 to provide the USB data 115 on the bus 150. In some embodiments, the USB data 115 may be a request for the device 160, or may be an acknowledgement of USB response data 144 received from the device 160. The USB data 115 may be a complete bit sequence or substantially complete bit sequence that is available for transmission over the bus 150. For instance, when the USB data 115 is a complete bit sequence, the USB host system 100 may directly retrieve the USB data 115 from memory 110 and send it over the bus 150 without having to perform additional processing on the data. When the USB data 115 is a substantially complete bit sequence, the USB host system 100 may directly retrieve the USB data 115 from memory 110 and send it over the bus 150 with little additional processing, such as appending a preamble, etc.

The USB host system 100 includes a serializer/deserializer 130 to perform serialization operations on outgoing data and deserialization operations on data incoming from the bus 150. The USB host system 100 may also include a universal asynchronous receiver and transmitter (UART) 170 to sample USB response data 144 from the device 160. In some embodiments, the central processor 120 or other device in the USB host system 100 may sample USB response data 144 from the device 160. The UART 170 may over-sample the USB response data 144, for example using a 4 times over-sampling process, to recover the response and to generate sampled USB response data 172. The UART 170 may provide the sampled USB response data 172 to the central processor 120 via the serializer/deserializer 130 for storage and processing.

When the central processor 120 receives the USB state 142 indicating that the USB peripheral device 160 is coupled to the USB host system 100, the central processor 120 may retrieve a pre-generated Get_Device_Descriptor request, which is a standard USB request, from the memory 110. Once the pre-generated Get_Device_Descriptor request is provided to the device 160 over the bus 150, the device 160 may generate a response to the pre-generated Get_Device_Descriptor request. The response may include a device descriptor that describes the type of device coupled to the USB host system 100 via the bus 150.

The USB host system 100 may receive the response at the USB interface 140 as USB response data 144 and provide the USB response data 144 to the UART 170. The UART 170 may sample the USB response data 144 and provide the sampled USB response data 172 to the central processor 120 via the serializer/deserializer 130 for storage and/or processing. In some embodiments, the UART 170 may over-sample the USB response data 144, for example, using a 4 times over-sampling process, to generate sampled USB response data 172.

The central processor 120 may direct the USB host system 100 to provide an acknowledgement to the response from the device 160. The acknowledgement may be stored in the memory 110 as pre-generated USB data 115, which is retrieved responsive to the reception of the response from the device 160. In some embodiments, the acknowledgement is sent to the device 160 over the bus 150 prior to the central processor 120 parsing the response to identify the device descriptor.

The central processor 120 may store the sampled USB response data 172 in the memory 110, and then subsequently retrieve the sampled USB response data 172 for processing. The central processor 120 may parse the sampled USB response data 172 to determine whether the USB response data 144 was correctly received by the USB host system 100. For instance, the central processor 120 may perform a cyclical redundancy check (CRC) and compare the results of the CRC to the contents of a CRC field in the USB response data 144.

As delineated in the USB 3.0 protocol, a USB 3.0 compatible USB host system 100 is configured to detect the device 160 at least twice when connected. Repetitive detection allows the USB host system 100 to perform re-enumeration on the device 160 to thereby obtain any updated device configuration data.

The device 160 may comprise a USB peripheral device and include a USB interface 195. The USB interface 195 may indicate when the device 160 is coupled to the USB host system 100 via the bus 150 and provide a USB state that indicates the device 160 is coupled to the USB host system 100 via the bus 150.

Depending on the particular configuration and purpose, the device 160 may include various components for carrying out the operation of the device 160. For example, the device may be an input device, such as a keyboard, pointing device (e.g., mouse, light pen, joystick, touch screen, gaming devices, and the like), imaging device (e.g., a webcam, videocam, scanner, and the like), or an audio device (e.g., microphone) for providing data and control signals to a host system 100 via a device processor 180. Thus, the input device may include buttons, cameras, optical readers, or other components in communication with the device processor 180.

In another example, the device 160 may be an output device that delivers an output to a user resulting from processing completed by the host system 100. For example, the output device may include speakers, headphones, video screen, and the like and may include operational components associated with such devices. Those operational components may be in communication with the device processor 180, in an embodiment.

In other embodiments, the device 160 includes a memory 190, which may include software stored therein for processes that present device configuration data to the USB host system 100 to thereby allow the USB host system 100 to identify the device 160.

Although the processor 180 and memory 190 are depicted in phantom, it will be appreciated that one or both components may be included in the device 160. In other embodiments, additional components, including but not limited to those described above, may also be included as part of the device 160.

When a host (e.g., host system 100) is connected to a device (e.g., device 160), the host reads device descriptors to determine the capabilities of the device to thereby allow drivers to be loaded onto the device. In this regard, the host performs an enumeration protocol on the device. If the configuration descriptors of the device need to be re-read, the host performs re-enumeration on the device. To induce the host into performing re-enumeration on the device, the device transmits an indicator to the host to cause a host Link Training and Status State Machine (LTSSM) to move from active state (U0) to one of SS.Inactive and RX.Detect. In an embodiment, the host LTSSM moves to RX.Detect after SS.Inactive. In any case, after RX.Detect, the host LTSSM continues to polling and then to U0.

Figures 2, 3:
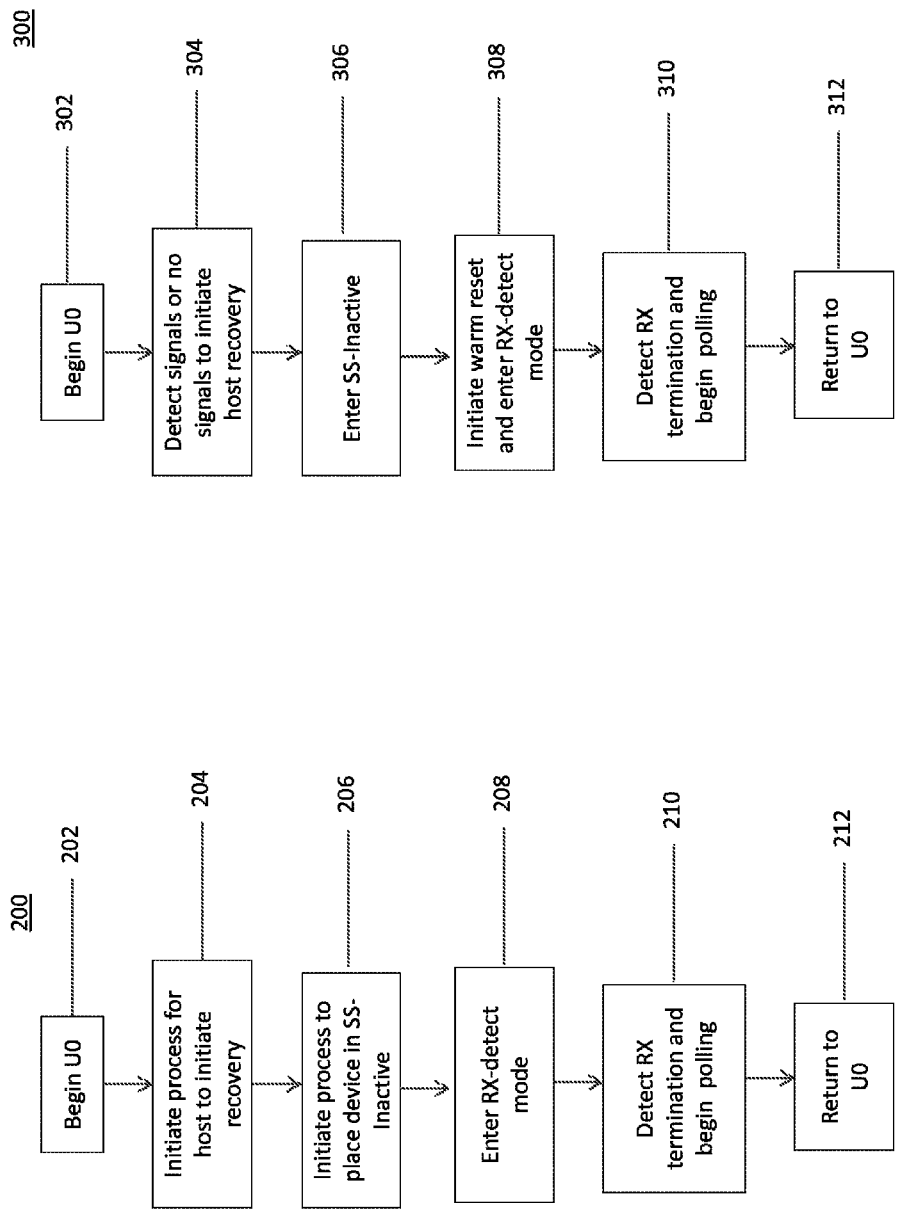
FIG. 2 is a flow diagram of a method of inducing a host to perform re-enumeration on a device, according to an embodiment.
FIG. 3 is a flow diagram of a method of performing re-enumeration on a device by a host, according to an embodiment.

Several methods may be used to induce the host to perform re-enumeration. FIG. 2 is a flow diagram of a method 200 of inducing a host to perform re-enumeration on a device, according to an embodiment. The device begins a U0 state, step 202. For example, the device (e.g., device 160) enters a U0 link state, which indicates that the device is active. In the U0 state, a connection between the device and host (e.g, host system 100) may be established as a default configuration.

Next, the device directs initiation of a process for the host to initiate recovery, step 204. For example, the device may provide error messages to the host, such as by stopping LUP transmission if the USB (e.g., bus 150) is IDLE. In another embodiment, the device may provide error messages that stop LGOOD and LCRD transmissions to cause timeout at a link layer of the host or that include a corrupt sequence number on LGOOD, LCRD, or on a header packet. In still yet another embodiment, the instructions may cause the device to engage in a successful LFPS exit handshake from a low power state (e.g., U1, U2, or U3) to recovery or during the handshake may respond with an improper LFPS. In still yet another embodiment, the device may be instructed to initiate recovery without detecting any error.

In any case, the firmware directs initiation of a process to place the device into an SS.Inactive mode, step 206. As a result, the device receives a signal indicating a warm reset has been initiated by the host. After the warm reset signal is received, the device enters an RX.Detect mode, step 208. At this point, the device resets. Additionally, the device and the host, which is also in an RX.Detect mode, synchronize. After the device and host are synchronized, the device detects RX termination from the host and begins polling, step 210. Training completes after polling and the device returns to a U0 state, step 212. At the U0 state, the device and the host re-establish a connection, and the device presents a new configuration to the device. Specifically, the device (e.g., device 160) may receive a pre-generated Get_Device_Descriptor request from the host 100 over the bus 150 and may generate a response to the pre-generated Get_Device_Descriptor request. The response may include a device descriptor that describes the type of device coupled to the host 100 via the bus 150.

FIG. 3 is a flow diagram of a method 300 of performing re-enumeration on a device by a host, according to an embodiment. Some of the steps of method 300 may occur substantially simultaneously with those of method 200. The host begins a U0 state, step 302. When the host is in U0 state, it may be connected with the device. For example, a bus (e.g., bus 150) connects a USB physical interface (e.g., USB physical interface 140) of the host (e.g., host system 100 to a USB physical interface (e.g., USB physical interface 170) of the device (e.g., device 160). Next, the host receives an indication from the device, which causes the host to initiate recovery, step 304. Specifically, the indications include, but are not limited to those described above in conjunction with step 204 of method 200 in FIG. 2. As noted in the above description, in some embodiments, the host enters a low power state (e.g., U1, U2, or U3) after U0 and prior to entry into recovery. After recovery, the host enters an SS.Inactive mode, step 306. In an embodiment, the host enters a hot reset prior to moving to SS.Inactive. In another embodiment, the host enters loopback prior to moving to SS.Inactive. Subsequently, the host initiates a warm reset and enters an RX.Detect mode, step 308.

In other embodiments of the method 300, step 304 is omitted. For example, the host Link Training and Status State Machine (LTSSM) may respond to the device by moving from U0 to U1, U2 or U3 to SS.Inactive mode. In another embodiment, step 306 is omitted and the host moves from U0 to recovery to loopback to RX.Detect mode. In any case, during the RX.Detect mode, the host enters warm reset, and the host and the device synchronize.

After the host and device are synchronized, the host detects RX termination from the device and begins polling, step 310. Training completes after polling and the host returns to a U0 state, step 312. Subsequently, the host receives a new configuration from the device to begin re-enumeration on the device. For example, a central processor (e.g., central processor 120 of the host 100 in FIG. 1) may retrieve a pre-generated Get_Device_Descriptor request, which is a standard USB request, from a memory (e.g., memory 110 of FIG. 1) causing the host to retrieve the new device configurations.

By manipulating link connectivity and link power management (e.g., via the link training and status state machine (LTSSM)), the device emulates disconnect and/or connect between the device and host. As a result, a USB 3.0 host and USB 3.0 device may reconnect with each other and the device may be recognized as a new device. Accordingly, re-enumeration of the device may be performed by the host.

What is claimed is:
1. A system comprising:
a peripheral device; and
a host device connected to the peripheral device over a bus compatible with a Universal Serial Bus (USB) 3.0 specification, wherein the host device comprises:

a reduced functionality USB host controller configured to perform a set of one or more preprogrammed functions from the USB 3.0 specification; and a universal asynchronous receiver and transmitter (UART) configured to sample USB response data received from the peripheral device over the bus, wherein, when in an active (U0) state, the peripheral device is configured to enter into an SS.Inactive state and to induce the host device to perform re-enumeration.

2. The system of claim 1, wherein the host device further comprises:

a memory; and a central processor configured to receive a USB bit sequence from the memory responsive to a USB state and to cause the USB bit sequence to be provided on the bus without having to perform additional processing on the USB bit sequence.

3. The system of claim 2, wherein the central processor is further configured to cause a preamble to be appended to the USB bit sequence prior to the USB bit sequence being provided on the bus.

4. The system of claim 1, wherein the peripheral device is one of an input device, a pointing device, an imaging device, and an audio device.

5. The system of claim 1, wherein the peripheral device is an output device that includes one or more of a speaker, a video screen, and a headphone set.

* * * * *